(12) United States Patent
Yokoo

(10) Patent No.: US 11,165,374 B2
(45) Date of Patent: Nov. 2, 2021

(54) SENSOR-LESS CIRCUITS AND RELATED METHODS FOR BACK EMF ZERO CROSSING DETECTION

(71) Applicant: SEMICONDUCTOR COMPONENTS INDUSTRIES, LLC, Phoenix, AZ (US)

(72) Inventor: Satoshi Yokoo, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 43 days.

(21) Appl. No.: 16/837,575

(22) Filed: Apr. 1, 2020

(65) Prior Publication Data

US 2021/0119560 A1    Apr. 22, 2021

Related U.S. Application Data

(60) Provisional application No. 62/916,448, filed on Oct. 17, 2019.

(51) Int. Cl.
| | |
|---|---|
| H02P 6/00 | (2016.01) |
| H02P 6/16 | (2016.01) |
| H02P 6/182 | (2016.01) |
| H02M 7/5387 | (2007.01) |

(52) U.S. Cl.
CPC ........ *H02P 6/182* (2013.01); *H02M 7/53871* (2013.01)

(58) Field of Classification Search
CPC ............................ H02P 6/182; H02M 7/53871
USPC ....................................................... 318/400.35
See application file for complete search history.

(56) References Cited

U.S. PATENT DOCUMENTS

| | | | |
|---|---|---|---|
| 4,996,470 A * | 2/1991 | Rowan | H02P 3/18 318/772 |
| 2016/0181956 A1 | 6/2016 | Wu et al. | |
| 2016/0320207 A1 * | 11/2016 | Yokoo | H02P 6/187 |
| 2016/0320208 A1 | 11/2016 | Yokoo et al. | |
| 2018/0175765 A1 * | 6/2018 | Ishikawa | H02P 21/22 |
| 2019/0181783 A1 | 6/2019 | Narumi | |

* cited by examiner

*Primary Examiner* — Erick D Glass
(74) *Attorney, Agent, or Firm* — Adam R. Stephenson, LTD.

(57) ABSTRACT

A sensor-less detection circuit includes a first voltage adjustment circuit providing a first output voltage at a first node using one of three input voltages. A second voltage adjustment circuit provides a second output voltage at a second node using all three, or only two, of the three input voltages. The second voltage adjustment circuit acts as an internal virtual neutral point for detecting a zero crossing event of the motor. A differential amplifier is coupled with the first and second nodes and outputs a third output voltage at a third node. A reference buffer has a reference voltage input and provides a fourth output voltage at a fourth node. A comparator is coupled with the third and fourth nodes and outputs a fifth output voltage at a fifth node, the fifth voltage indicating a zero cross event.

20 Claims, 4 Drawing Sheets

SENSOR-LESS CIRCUITS AND RELATED METHODS FOR BACK EMF ZERO CROSSING DETECTION

CROSS REFERENCE TO RELATED APPLICATIONS

This application claims the benefit of the filing date of U.S. Provisional Patent Application No. 62/916,448, entitled "Sensor-less Circuits for Back EMF Zero Crossing Detection," naming as first inventor Satoshi Yokoo, which was filed on Oct. 17, 2019, the disclosure of which is hereby incorporated entirely herein by reference.

BACKGROUND

1. Technical Field

Aspects of this document relate generally to circuits and methods for back electromotive force (BEMF) zero crossing detection.

2. Background

Three-phase motors use electricity applied to the motor in three different phases to rotate the motor. The phases ordinarily involve separate electrical connections and are commonly referred to as the U phase, V phase, and W phase.

SUMMARY

Implementations of sensor-less detection circuits may include: a first voltage adjustment circuit configured for providing a first output voltage, at a first node, using one of a first input voltage, a second input voltage, and a third input voltage; a second voltage adjustment circuit configured for providing a second output voltage, at a second node, using the first input voltage, the second input voltage, and the third input voltage; a differential amplifier having a first input coupled with the first node and a second input coupled with the second node and configured for providing a third output voltage at a third node; a reference buffer having a reference voltage input and configured for providing a fourth output voltage at a fourth node; and a comparator having a first input coupled with the third node and a second input coupled with the fourth node and configured for providing a fifth output voltage at a fifth node; wherein the sensor-less detection circuit is configured to detect a zero crossing event of a three-phase motor.

Implementations of sensor-less detection circuits may include one, all, or any of the following:

The sensor-less detection circuit may not use a Hall-effect sensor.

The first voltage adjustment circuit may include a plurality of resistive voltage dividers each including a first resistor having a first resistance and a second resistor having a second resistance.

The second voltage adjustment circuit may include a plurality of resistive voltage dividers each including a third resistor and a fourth resistor. Each third resistor may have a third resistance three times the first resistance and each fourth resistor may have a fourth resistance three times the second resistance.

The first voltage adjustment circuit may include a plurality of first switches. Each first switch may have a fifth resistance.

The second voltage adjustment circuit may include a plurality of second switches. Each second switch may have a sixth resistance three times the fifth resistance.

The first node may be connected with the third node through at least one resistor not included in the differential amplifier.

The second node may be connected with the fourth node through at least one resistor not included in the differential amplifier or the comparator.

The second voltage adjustment circuit may include an internal virtual neutral point.

Implementations of sensor-less detection circuits may include: a first voltage adjustment circuit configured for providing a first output voltage, at a first node, using one of a first input voltage, a second input voltage, and a third input voltage; a second voltage adjustment circuit configured for providing a second output voltage, at a second node, using two of the first input voltage, the second input voltage, and the third input voltage; a differential amplifier having a first input coupled with the first node and a second input coupled with the second node and configured for providing a third output voltage at a third node; a reference buffer having a reference voltage input and configured for providing a fourth output voltage at a fourth node; and a comparator having a first input coupled with the third node and a second input coupled with the fourth node and configured for providing a fifth output voltage at a fifth node; wherein the sensor-less detection circuit is configured to detect a zero crossing event of a three-phase motor.

Implementations of sensor-less detection circuits may include one, all, or any of the following:

The sensor-less detection circuit may not use a Hall-effect sensor.

The first voltage adjustment circuit may include a plurality of resistive voltage dividers each including include a first resistor having a first resistance and a second resistor having a second resistance.

The second voltage adjustment circuit may include a plurality of resistive voltage dividers each including a third resistor and a fourth resistor. Each third resistor may have a third resistance twice the first resistance and each fourth resistor may have a fourth resistance twice the second resistance.

The first voltage adjustment circuit may include a plurality of first switches each having a fifth resistance.

The second voltage adjustment circuit may include a plurality of second switches each having a sixth resistance twice the fifth resistance.

The first node may be connected with the third node through at least one resistor not included in the differential amplifier.

The second node may be connected with the fourth node through at least one resistor not included in the differential amplifier or the comparator.

The second voltage adjustment circuit may include an internal virtual neutral point.

Implementations of methods of sensor-less detection of a zero crossing point of a three-phase motor may include: electrically coupling a first voltage adjustment circuit with a three-phase brushless direct current (BLDC) motor and, using one of a first input voltage, a second input voltage, and a third input voltage, providing a first output voltage at a first node using the first voltage adjustment circuit; electrically coupling a second voltage adjustment circuit with the BLDC motor and, using at least two of the first input voltage, the second input voltage, and the third input voltage, providing a second output voltage at a second node using the second voltage adjustment circuit; electrically coupling a first input of a differential amplifier with the first node, electrically coupling a second input of the differential amplifier with the second node, and, using the differential amplifier, providing a third output voltage at a third node; providing a reference buffer having a reference voltage input, the reference buffer providing a fourth output voltage at a fourth node; and electrically coupling a first input of a comparator with the third node, electrically coupling a second input of the comparator with the fourth node, and, using the comparator, providing a fifth output voltage at a fifth node; wherein the fifth output voltage indicates a zero crossing event of the BLDC motor.

Implementations of methods of sensor-less detection of a zero crossing point of a three-phase motor may include one, all, or any of the following:

Providing the second output voltage at the second node using the second voltage adjustment circuit may include using all three of the first input voltage, the second input voltage, and the third input voltage.

The first voltage adjustment circuit may include a plurality of resistive voltage dividers each including a first resistor having a first resistance and a second resistor having a second resistance.

The second voltage adjustment circuit may include a plurality of resistive voltage dividers each including a third resistor having a third resistance and a fourth resistor having a fourth resistance. The third resistance may be twice or three times the first resistance and the fourth resistance may be twice or three times the second resistance.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended sensor-less circuits and related methods for back EMF zero crossing detection will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such sensor-less circuits and related methods for back EMF zero crossing detection, and implementing components and methods, consistent with the intended operation and methods.

During the operation of a three phase motor, for example at startup and at other times during operation, the motor controller needs to detect the position and rotation speed of the rotor of the motor. Accurately doing so may allow for precise motor control by adjusting the timing of an applied supply voltage to the motor windings. In some motors, Hall sensors may be used to detect the rotor position, but for sensor-less motors, the position may be detected using a back electromotive force (BEMF) signal, such as by comparing the BEMF signal with a voltage to determine when the motor crosses the zero point (a zero crossing event). Back electromotive force (BEMF) zero crossing detection is used to determine the position of the rotor of the motor relative to the stator of the motor at a given point in time. Being able to repeatedly determine the position of the rotor relative to the stator allows for accurate timing in energizing the different windings of the motor for efficient operation of the motor.

Implementations of sensor-less circuits for BEMF zero crossing detection disclosed herein detect a zero crossing point of a rotor of a three-phase motor without the use of Hall sensors. Particular implementations of sensor-less circuits for BEMF zero crossing detection disclosed herein also exclude, or move, a virtual neutral point.

Figure 1:
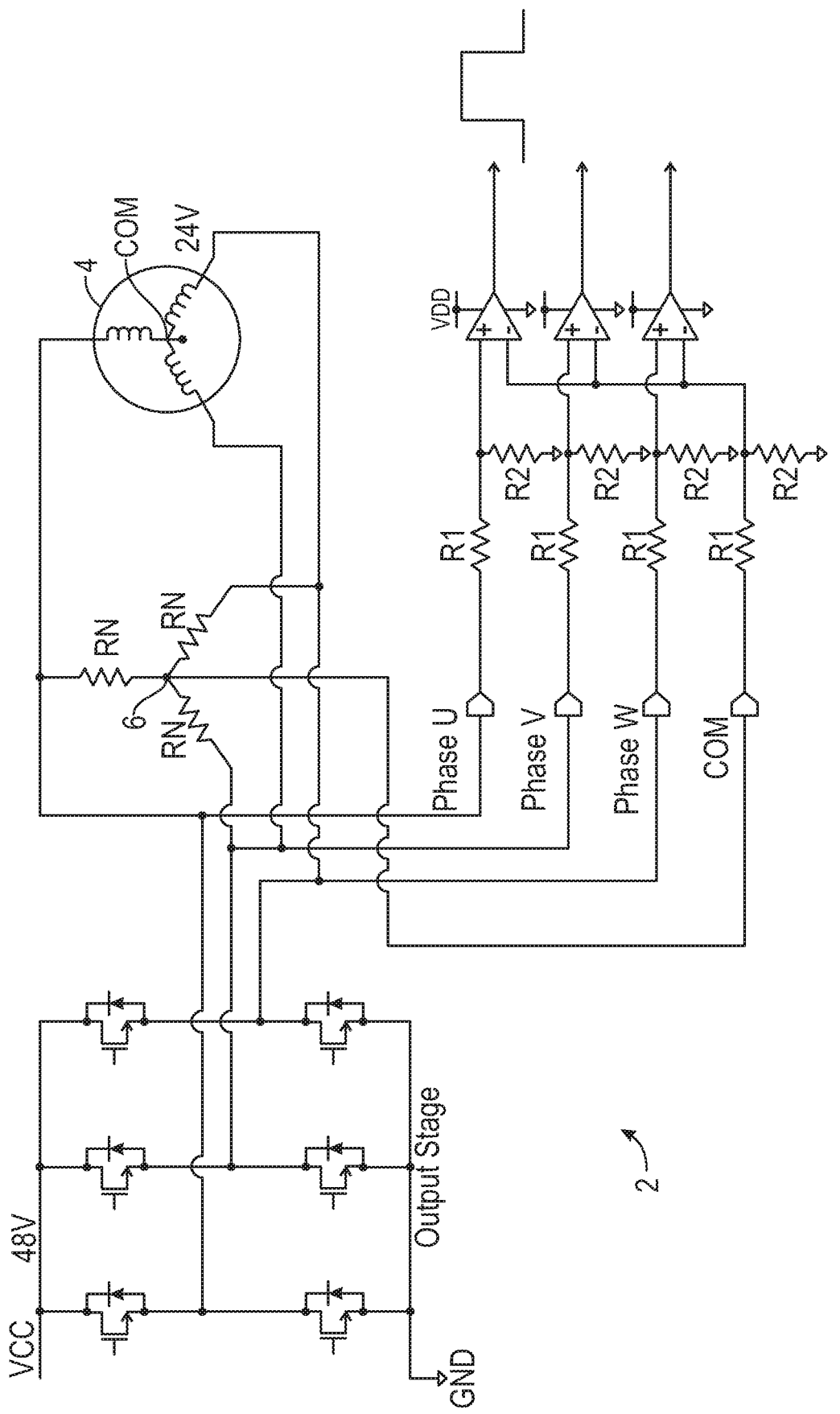
FIG. 1 is a circuit diagram representatively illustrating an implementation of a sensor-less circuit for BEMF zero crossing detection.

Referring now to FIG. 1, an implementation of a sensor-less circuit (circuit) 2 for BEMF zero crossing detection is illustrated. The circuit is coupled with a motor which in this implementation is a three-phase brushless direct current (BLDC) motor (motor) 4 powered by a supply voltage VCC through pulse width modulation (PWM) using six transistor combinations. The transistors are configured/operated such that, at any given time during operation of the motor, two of the motor windings are PWM driven while the third winding is unpowered. A BEMF signal is generated in the non-energized winding as it rotates through the motor's magnetic field, and this BEMF signal may be used to detect the zero crossing point of the rotor without the use of Hall sensors.

In order to detect the zero crossing point, circuit 2 includes a virtual neutral point 6 which is formed by the use of three resistors RN. Resistive voltage dividers each including R1 and R2 resistors are then used to attenuate the Phase U, Phase V, Phase W and COM voltages to lower voltages such as 5 V or 3.3 V. The analog, divided/reduced COM voltage is fed into the inputs of each of three comparators, each of which also receives one of the analog, divided/reduced voltages of Phase U, Phase V, or Phase W. Each comparator is coupled with a supply voltage VDD and flips its output when the analog, divided/reduced COM voltage crosses the point where it is equal to the other input voltage of that comparator, which other input voltage will be the BEMF signal of the non-energized winding. In this way, the BEMF signal is used to detect a zero crossing point, and this information may be fed back to the transistors to adjust the timing of the supply of VCC to the windings using PWM. An example signal is illustrated to the right of the topmost comparator, representatively illustrating how the signal from each comparator may toggle between a first value and a second value.

For sensor-less BEMF detection it is desirable for the circuit to have low current consumption and high accuracy. For the circuit of FIG. 1, to achieve low current consumption it would be desirable to configure the RN resistors with the highest resistance possible. To achieve high accuracy of the BEMF detection with the circuit of FIG. 1, however, it would be desirable to configure the RN resistors with the lowest possible resistance. These goals are accordingly at odds with one another.

In order to perform sensor-less BEMF detection of the zero crossing using the circuit of FIG. 1, ideally the virtual neutral point 6 and the motor middle point COM would have the same voltage so that the BEMF voltage and the motor middle point voltage are exactly equal when the circuit indicates a zero crossing. The lower the resistances of RN resistors the more this ideal can be approached but, as indicated, doing this increases the current consumption. A mismatch voltage is accordingly generated between the motor middle point COM and the virtual neutral point 6. VCC in the example of FIG. 1 is 48 V, the voltage at the motor middle point COM is 24 V, R1+R2=100 kohm, and RN=1 kohm. The virtual neutral point voltage may be calculated as follows:

$$V = \frac{VCC}{2} \times \frac{R1+R2}{\frac{RN}{3}+R1+R2} = 23.92027 \text{ V}$$

The above calculation results in a voltage mismatch ΔCOM of −79.73 mV. The RN current may be calculated as follows:

$$I = \frac{VCC - \text{Virtual Neutral Point}}{RN} = \frac{48-23.92027}{1k} = 24.07973 \text{ mA}$$

Accordingly, high accuracy BEMF zero cross detection cannot be performed as the resistance values of RN are increased. As the resistances are decreased the current consumption also increases.

Figure 2:
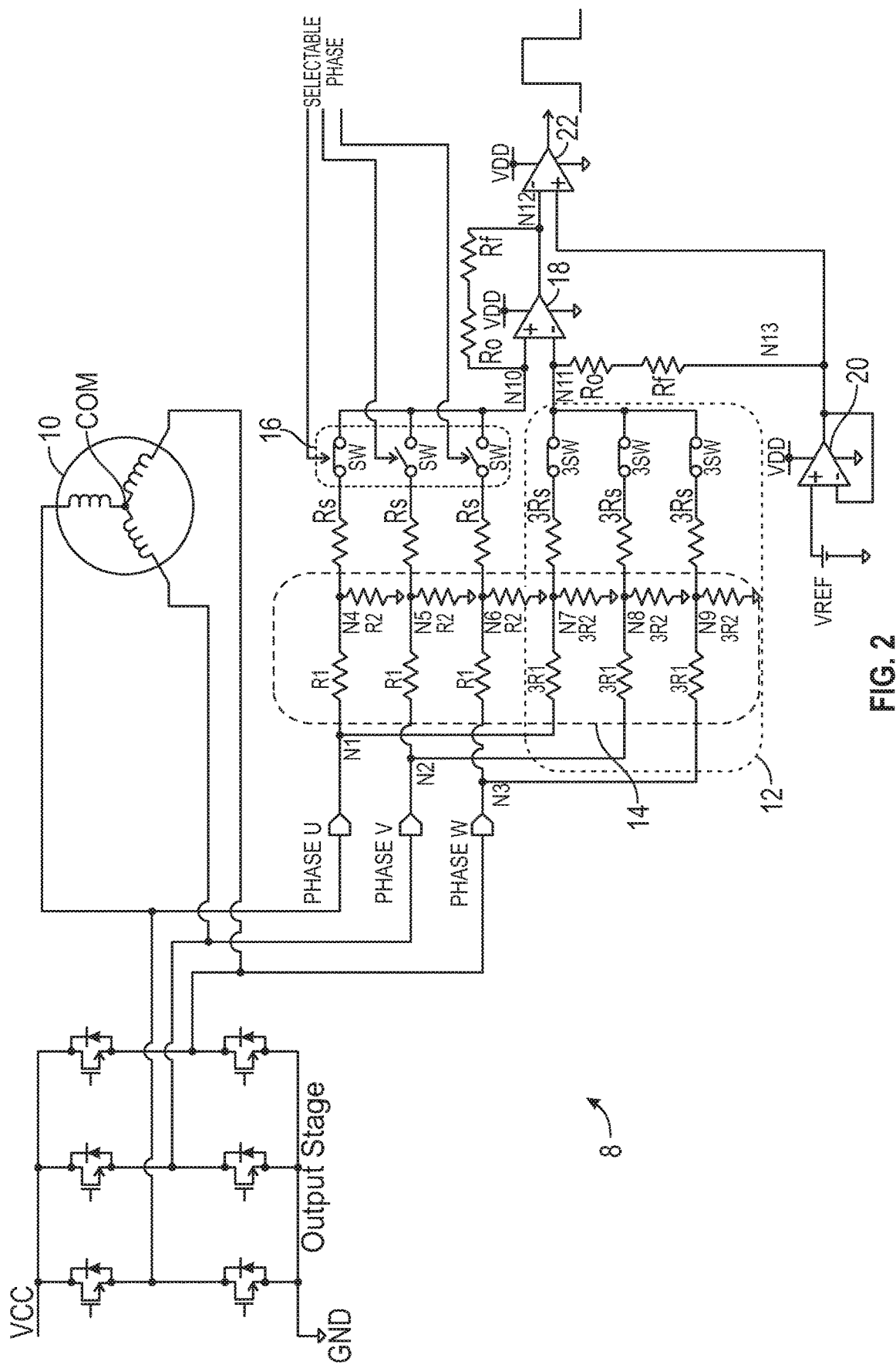
FIG. 2 is a circuit diagram representatively illustrating another implementation of a sensor-less circuit for BEMF zero crossing detection.

Reference is now made to FIG. 2, which representatively illustrates another implementation of a sensor-less circuit (circuit) 8 for BEMF zero crossing detection. Circuit 8 is coupled with a three-phase brushless direct current (BLDC) motor (motor) 10. The resistors RN have been entirely removed and instead an "internal virtual neutral point" 12 is formed using resistive voltage dividers 14 and other resistors and switches, as will be explained. Resistors R1 and R2 form voltage dividers which are each coupled with one of nodes N1, N2, N3 to provide a divided/reduced voltage at nodes N4, N5 and N6. Each of nodes N4-N6 is selectively coupled with node N10 through a resistor Rs and one of the select switches (SW) 16, and one or more elements not shown on the circuit diagram are used to select which select switch SW is in the closed configuration. The switch that is in the closed configuration passes the divided/reduced, analog BEMF voltage signal to node N10 as one input of the differential amplifier 18.

FIG. 2 shows only one of the switches SW in the closed configuration, and indeed at any given time only one of the phase voltages will be passed to node N10 to provide the BEMF signal for that phase, but the switches SW may be closed/opened in sequence, with one at a time in the closed configuration, to sequentially detect zero crossing points using the BEMF signal of each winding. When any given switch SW is closed, for example the Phase U switch SW, since the other two switches SW are opened the other two Phase signals (in this case Phase V and Phase W) do not affect the voltage signal at node N10.

Referring back to nodes N1, N2 and N3, resistors 3R1 and 3R2 form voltage dividers which are each coupled with one of the nodes N1-N3 to provide a divided/reduced voltage at nodes N7, N8 and N9. Each of nodes N7-N9 is coupled with node N11 through a resistor 3Rs and switch 3SW. The switches 3SW are all shown in the closed configuration, and indeed they are to remain in the closed configuration permanently so that each of the voltages at N7-N9 affects the voltage at N11. The voltage signal at node N11 is the other input of the differential amplifier 18.

The resistive voltage dividers formed by resistors 3R1 and 3R2, and the resistors 3Rs and switches 3SW, along with connecting elements, form the internal virtual neutral point 12. The internal virtual neutral point 12 allows node N11 to have a voltage representative of the motor midpoint voltage COM, but without using the prior Y-connected resistors RN of the FIG. 1 circuit. This allows the circuit of FIG. 2 to detect the zero crossing without reducing accuracy due to the RN resistors. The 3R1, 3R2, and 3Rs resistors in the FIG. 2 circuit are configured to have three times the resistance of the R1, R2, and Rs resistors, respectively, and the 3SW switches are configured to have three times the resistance of the SW switches, to more accurately represent the BEMF signal and the COM signal at the N10 and N11 nodes, respectively, as inputs to the differential amplifier 18. The use of each 3SW switch is, accordingly, only to provide a resistance matching three times the resistance of the SW switch, and it is for this reason that the 3SW switches are included in the circuit even though they always remain in the closed configuration.

The internal virtual neutral point signal side and the BEMF signal side are accordingly separated and the three phases on the internal virtual neutral point side are connected in parallel. The resistance on each parallel line on the internal virtual neutral point side (including the resistance of the resistors and the resistance of the switches) is accordingly three times that on the BEMF side. This is done to more accurately detect when the zero crossing occurs. The voltage input to the differential amplifier 18 from each parallel line of the internal virtual neutral point 12 is thus reduced or "burned" by three times what the voltage input from the BEMF signal is burned at, so that the input voltage values on the input lines to the differential amplifier are matched. The differential amplifier 18 can then accurately signal when the voltage value from the virtual internal neutral point 12 and BEMF side alternate between equal and unequal, thus signaling the zero crossing point.

A reference buffer 20 is also illustrated in FIG. 2, which is a voltage follower having a supply voltage VDD and a reference voltage VREF. The output of the reference buffer is coupled with node N13, which is an input to a comparator 22. The output of the differential amplifier 18 is the other input to the comparator 22, so that the input voltages of the comparator are the voltages at nodes N12 and N13, while the comparator (and the differential amplifier) are also supplied with supply voltage VDD. The reference voltage VREF is used to provide an appropriate voltage input at node N13 so that, when the output voltage from the differential amplifier 18 at node N12 switches between equal with the voltage at N13 and unequal with the voltage at N13, the comparator can send a signal that the zero crossing has been detected.

The resistive voltage dividers may be adjusted so that the voltage levels provided to the differential amplifier are within its operation range and otherwise to adjust for the rating of the low-voltage elements of the circuit. High voltage signals may be attenuated to low voltages such as 5 V or 3.3 V using the resistive voltage dividers themselves, so that the circuit may be used to detect the zero crossing even on high voltage motors. The circuit of FIG. 2 also allows for BEMF zero crossing detection across a wide range of voltages, from negative voltages to positive voltages, using the resistive voltage dividers and the differential amplifier.

The attenuation ratio may be determined/configured as follows:

$$\text{Attenuation Ratio} = \frac{R2}{R1 + R2}$$

The resistance of Ro may be tailored as follows:

$$Ro = \frac{1}{\frac{1}{R1} + \frac{1}{R2}}$$

Resistors Ro and Rf are provided between nodes N10 and N12 and also between nodes N11 and N13, respectively, to tailor the gain and provide a low pass filter, such as for common-mode noise rejection, which can be an advantage of receiving the BEMF signal and internal virtual neutral point signal as differential inputs to the differential amplifier. The gain of the differential amplifier 18 may be tailored as follows, where RSW is the resistance of the switch SW:

$$\text{Diff.Amp Gain} = \frac{Rf + Ro}{Rs + Ro + RSW}$$

The total gain is the attenuation ratio multiplied by the differential amplifier gain.

The comparator 22 of FIG. 2 may detect the zero crossing, using the BEMF voltage of one of the phases, without being affected by any variation in the reference buffer 20 output because the reference buffer amplifier output is coupled with both inputs of the comparator, through node N13 and through the differential amplifier 18 to node N12. A reference voltage error thus will not affect the high accuracy BEMF zero crossing detection due to the common use by the differential amplifier 18 of the same reference voltage as the comparator 22.

With the circuit of FIG. 2 the differential amplifier 18 output is the same as the reference buffer 20 output at the time of zero crossing.

Figure 3:
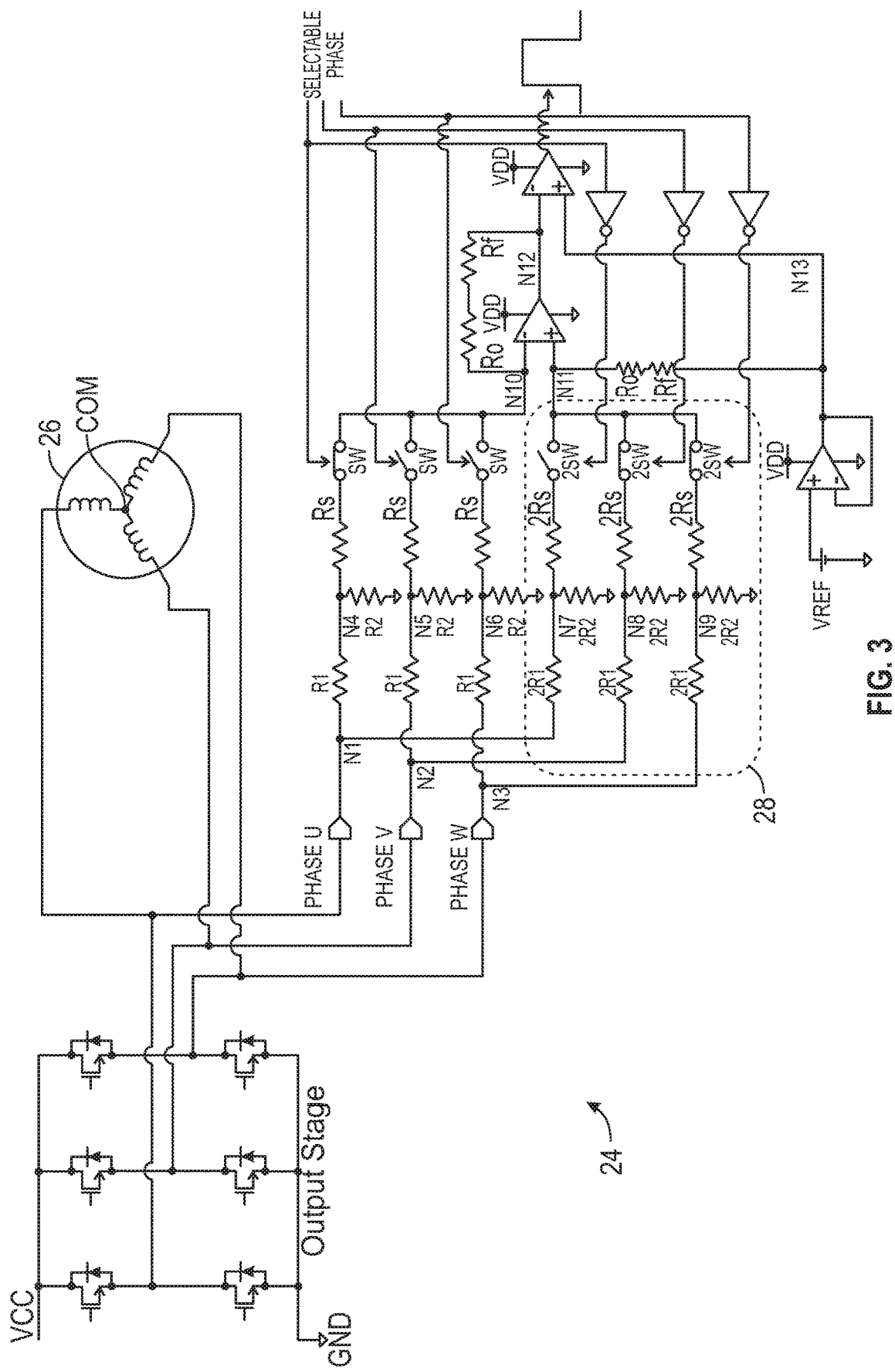
FIG. 3 is a circuit diagram representatively illustrating another implementation of a sensor-less circuit for BEMF zero crossing detection.

FIG. 3 representatively illustrates another implementation of a sensor-less circuit (circuit) 24 for back EMF zero crossing detection. Circuit 24 is coupled with a three-phase brushless direct current (BLDC) motor (motor) 26 and is identical to the circuit of FIG. 2 except that the internal virtual neutral point 28 uses two phase voltage inputs instead of all three. On the BEMF side the Phase U switch is illustrated as closed so that the BEMF signal from Phase U is selected to be input through node N10 to the differential amplifier. On the internal virtual neutral point side the switches corresponding with the other two phases, Phase V and Phase W, are closed while the switch corresponding with the Phase U signal is open. Because only two phase signals are used for the internal virtual neutral point side, the resistors on the internal virtual neutral point side are only double that of the resistors on the BEMF side, instead of triple as with the FIG. 2 circuit. Accordingly, the resistors 2R1 and 2R2 of the voltage dividers of the virtual internal neutral point 28 are each double the resistance of the R1 and R2 resistors, respectively, of the voltage dividers of the BEMF side, the 2Rs resistors are double the resistance of the Rs resistors, and the 2SW switches are double the resistance of the SW switches.

FIG. 3 illustrates that each selection signal (selectable phase) that signals the opening/closing of one of the BEMF side switches SW is coupled with the virtual neutral point switch 2SW of the same phase through an inverter. Accordingly, the corresponding 2SW switch on the internal virtual neutral point side is closed/opened, so that when the BEMF side switch is open for a phase the same phase's virtual neutral point side switch is closed, and vice versa. During operation of the circuit of FIG. 3 the switches may be sequentially cycled on and off, as discussed above with respect to the circuit of FIG. 2.

With the circuit of FIG. 3 the differential amplifier output is the same as the reference buffer output at the time of zero crossing.

The circuits of FIGS. 2 and 3 may detect zero crossing using the BEMF signal of a three phase BLDC motor while one winding is in a high-Z (high inductance) state and two phases are PWM driven or while all phases are high-Z.

For the circuits shown in the drawings, any portion of a circuit which receives one or more input voltages and outputs one or more adjusted output voltages may be called a "voltage adjustment circuit." For example, referring to FIGS. 2 and 3, on the BEMF side any combination of SW switches, Rs resistors, and/or resistive voltage dividers which receives one or more input voltages and outputs one or more adjusted output voltages may be referred to as a voltage adjustment circuit. Accordingly, any of the following combinations of circuit elements may be accurately called a voltage adjustment circuit: one or more resistive voltage dividers, one or more Rs resistors, one or more SW switches, one or more SW switches plus one or more Rs resistors, or one or more Rs resistors plus one or more resistive voltage dividers, or one or more resistive voltage dividers plus one or more Rs resistors plus one or more SW switches. Similarly, on the internal virtual neutral point side of the FIG. 2 and FIG. 3 circuits, any combination of the resistive voltage dividers, 3Rs/2Rs resistors, and/or 3SW/2SW switches may be called a voltage adjustment circuit.

As further examples, referring to FIG. 2, sensor-less detection circuit 8 may be said to include a first voltage adjustment circuit which includes the top three resistive voltage dividers (formed from R1 and R2 resistors), the three Rs resistors, and the three SW switches. The first voltage adjustment circuit provides an output voltage, at N10, using only one of the three input voltages (Phase U, V, W voltages). Circuit 8 may also be said to include a second voltage adjustment circuit which includes the bottom three resistive voltage dividers (formed from 3R1 and 3R2 resistors), the three 3Rs resistors, and the three 3SW switches. The second voltage adjustment circuit provides an output voltage, at N11, using all three of the three input voltages (Phase U, V, W voltages).

Furthermore, referring to FIG. 3, sensor-less detection circuit 24 may be said to include a first voltage adjustment circuit which includes the top three resistive voltage dividers (formed from R1 and R2 resistors), the three Rs resistors, and the three SW switches. The first voltage adjustment circuit provides an output voltage, at N10, using only one of the three input voltages (Phase U, V, W voltages). Circuit 24 may also be said to include a second voltage adjustment circuit which includes the bottom three resistive voltage dividers (formed from 2R1 and 2R2 resistors), the three 2Rs resistors, and the three 2SW switches. The second voltage adjustment circuit provides an output voltage, at N11, using only two of the three input voltages (Phase U, V, W voltages).

Each element of the circuits, such as resistors, switches, differential amplifiers, comparators, and so forth may be described as having at least two terminals (and three terminals in the case of the differential amplifier, reference buffer and comparator), each terminal of each element being connected with one of the nodes of the circuit.

The voltages discussed herein may be termed "input" and "output" voltages. For example, referring to FIGS. 2-3 the voltages (phase voltages and BEMF voltage) of nodes N1-N3 may all be termed input voltages to the resistive dividers and the divided/reduced voltages of nodes N4-N9 each may be termed output voltages of or from the resistive dividers. The voltages at nodes N10 and N11 are output voltages of the switches (SW, 3SW, 2SW) (the voltage at node N11 may be at least partially an output voltage of the switches 2SW/3SW and also at least partially an output voltage of the Ro resistor between nodes N11 and N13, in implementations). The voltages at nodes N10 and N11 are also input voltages to the differential amplifier. The voltage at node N12 is an output voltage of/from the differential amplifier (the voltage at node N12 may be at least partially an output voltage of the differential amplifier and also at least partially an output voltage of the Rf resistor between nodes N10 and N12, in implementations). The voltage at node N12 is also an input voltage to the comparator. The voltage at node N13 is an output voltage of the reference buffer (the voltage at node N13 may be at least partially an output voltage of the reference buffer and also at least partially an output voltage of the Rf resistor between the N11 and N13 nodes, in implementations). The voltage at node N13 is also an input voltage to the comparator, and so forth.

Figure 4:
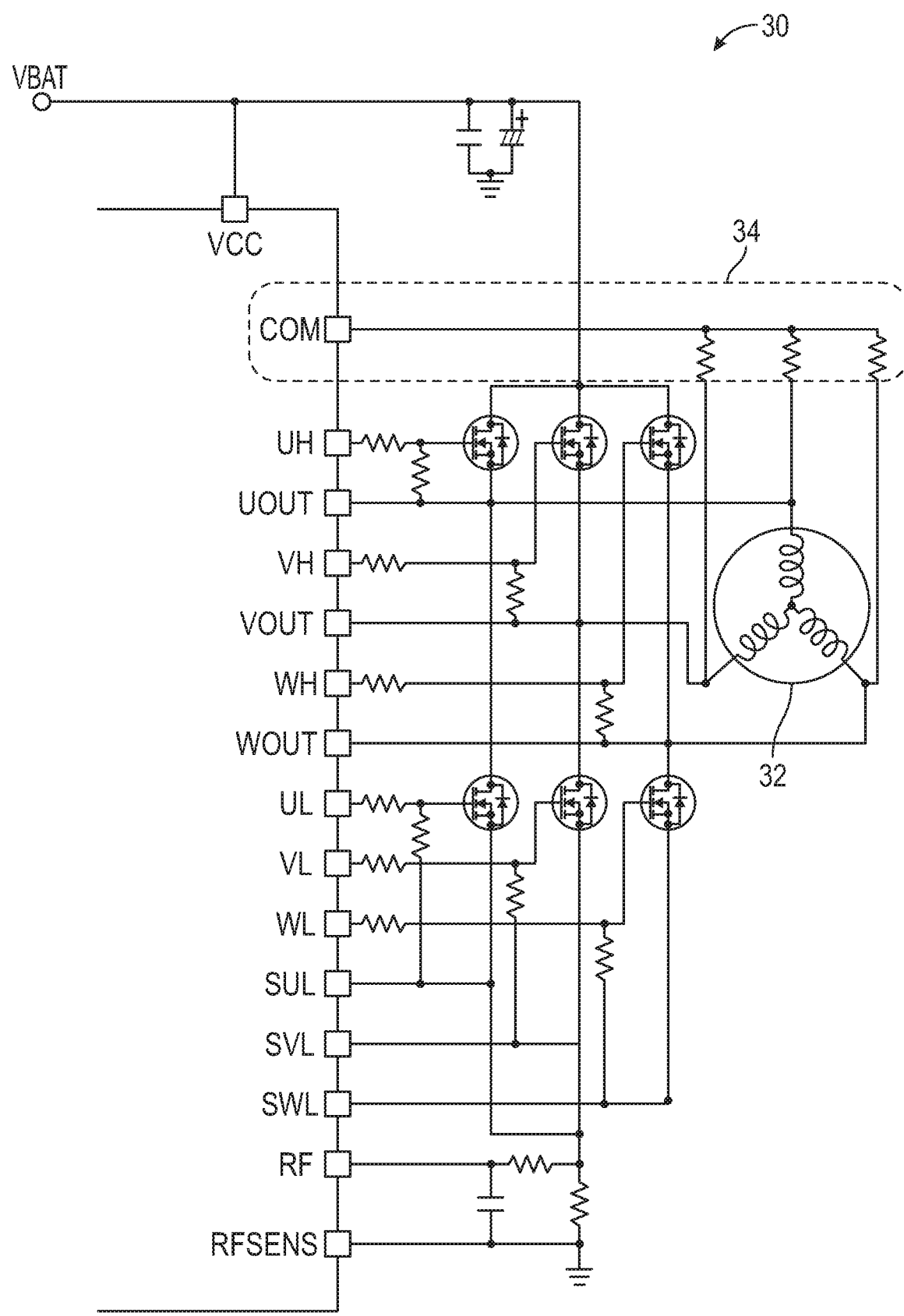
FIG. 4 is a circuit diagram representatively illustrating a controller circuit for a three-phase motor, the controller circuit including a sensor-less circuit for BEMF zero crossing detection.

FIG. 4 shows an example of a controller integrated circuit (IC) 30 that may include one or more of the sensor-less circuit elements disclosed herein. The controller IC is shown having I/O terminals such as UH, UOUT, VH, VOUT, WH, etc., which may be implemented as contact pads, pins, leads, etc. The control IC is coupled with a three-phase brushless direct current (BLDC) motor (motor) 32. The COM node is seen to have an "external" virtual neutral point 34. The current consumption of the controller/detection circuit may be reduced by modifying it to use an internal virtual neutral point within the controller IC itself, such as those disclosed in FIGS. 2-3, and the number of components and IC terminals/pins may be correspondingly reduced, as well.

The virtual neutral points of the circuits of FIGS. 2 and 3, being "internal" neutral points as opposed to the "external" neutral point of the FIG. 1 circuit, may reduce current consumption. The circuits of FIGS. 2-3 may allow for detection of the zero crossing even when the motor midpoint is not provided and without the use of an external virtual neutral point. The circuits may allow for high accuracy sensor-less zero cross detection in three phase BLDC motor drivers, even at high voltages, while consuming low power.

In implementations all of the components of the circuits disclosed herein are located within an integrated circuit (IC) of a semiconductor device, with the IC being electrically coupled with a three-phase BLDC motor as represented in the drawings to allow for control of the motor by the IC and to allow for back EMF zero crossing detection by the IC. The circuits disclosed herein may be used in a variety of industries, such as 48 V supply voltage for 5G telecom and automotive applications and BLDC motors which use a maximum operating voltage of about 100 V.

In places where the description above refers to particular implementations of sensor-less circuits and related methods for back EMF zero crossing detection and implementing components, sub-components, methods and sub-methods, it should be readily apparent that a number of modifications may be made without departing from the spirit thereof and that these implementations, implementing components, sub-components, methods and sub-methods may be applied to other sensor-less circuits and related methods for back EMF zero crossing-detection.

What is claimed is:

1. A sensor-less detection circuit, comprising:
    a first voltage adjustment circuit configured for providing a first output voltage, at a first node, using one of a first input voltage, a second input voltage, and a third input voltage;
    a second voltage adjustment circuit configured for providing a second output voltage, at a second node, using the first input voltage, the second input voltage, and the third input voltage;
    a differential amplifier having a first input coupled with the first node and a second input coupled with the second node and configured for providing a third output voltage at a third node;
    a reference buffer having a reference voltage input and configured for providing a fourth output voltage at a fourth node; and
    a comparator having a first input coupled with the third node and a second input coupled with the fourth node and configured for providing a fifth output voltage at a fifth node;
    wherein the sensor-less detection circuit is configured to detect a zero crossing event of a three-phase motor.

2. The circuit of claim 1, wherein the first voltage adjustment circuit comprises a plurality of resistive voltage dividers each comprising a first resistor having a first resistance and a second resistor having a second resistance.

3. The circuit of claim 2, wherein the second voltage adjustment circuit comprises a plurality of resistive voltage dividers each comprising a third resistor and a fourth resistor, wherein each third resistor comprises a third resistance three times the first resistance and wherein each fourth resistor comprises a fourth resistance three times the second resistance.

4. The circuit of claim 1, wherein the first voltage adjustment circuit comprises a plurality of first switches, each first switch comprising a fifth resistance.

5. The circuit of claim 4, wherein the second voltage adjustment circuit comprises a plurality of second switches each comprising a sixth resistance three times the fifth resistance.

6. The circuit of claim 1, wherein the first node is connected with the third node through at least one resistor, the differential amplifier not comprising the at least one resistor.

7. The circuit of claim 1, wherein the second node is connected with the fourth node through at least one resistor, the differential amplifier not comprising the at least one resistor and the comparator not comprising the at least one resistor.

8. The circuit of claim 1, wherein the second voltage adjustment circuit comprises an internal virtual neutral point.

9. A sensor-less detection circuit, comprising:
a first voltage adjustment circuit configured for providing a first output voltage, at a first node, using one of a first input voltage, a second input voltage, or a third input voltage;
a second voltage adjustment circuit configured for providing a second output voltage, at a second node, using two of the first input voltage, the second input voltage, or the third input voltage;
a differential amplifier having a first input coupled with the first node and a second input coupled with the second node and configured for providing a third output voltage at a third node;
a reference buffer having a reference voltage input and configured for providing a fourth output voltage at a fourth node; and
a comparator having a first input coupled with the third node and a second input coupled with the fourth node and configured for providing a fifth output voltage at a fifth node;
wherein the sensor-less detection circuit is configured to detect a zero crossing event of a three-phase motor.

10. The circuit of claim 9, wherein the first voltage adjustment circuit comprises a plurality of resistive voltage dividers each comprising a first resistor having a first resistance and a second resistor having a second resistance.

11. The circuit of claim 10, wherein the second voltage adjustment circuit comprises a plurality of resistive voltage dividers each comprising a third resistor and a fourth resistor, wherein each third resistor comprises a third resistance twice the first resistance and wherein each fourth resistor comprises a fourth resistance twice the second resistance.

12. The circuit of claim 9, wherein the first voltage adjustment circuit comprises a plurality of first switches each comprising a fifth resistance.

13. The circuit of claim 12, wherein the second voltage adjustment circuit comprises a plurality of second switches each comprising a sixth resistance twice the fifth resistance.

14. The circuit of claim 9, wherein the first node is connected with the third node through at least one resistor, the differential amplifier not comprising the at least one resistor.

15. The circuit of claim 9, wherein the second node is connected with the fourth node through at least one resistor, the differential amplifier not comprising the at least one resistor and the comparator not comprising the at least one resistor.

16. The circuit of claim 9, wherein the second voltage adjustment circuit comprises an internal virtual neutral point.

17. A method of sensor-less detection of a zero crossing event of a three-phase motor, comprising:
electrically coupling a first voltage adjustment circuit with a three-phase brushless direct current (BLDC) motor and, using one of a first input voltage, a second input voltage, or a third input voltage, providing a first output voltage at a first node using the first voltage adjustment circuit;
electrically coupling a second voltage adjustment circuit with the BLDC motor and, using at least two of the first input voltage, the second input voltage, or the third input voltage, providing a second output voltage at a second node using the second voltage adjustment circuit;
electrically coupling a first input of a differential amplifier with the first node, electrically coupling a second input of the differential amplifier with the second node, and, using the differential amplifier, providing a third output voltage at a third node;
providing a reference buffer having a reference voltage input, the reference buffer providing a fourth output voltage at a fourth node; and
electrically coupling a first input of a comparator with the third node, electrically coupling a second input of the comparator with the fourth node, and, using the comparator, providing a fifth output voltage at a fifth node;
wherein the fifth output voltage indicates a zero crossing event of the BLDC motor.

18. The method of claim 17, wherein providing the second output voltage at the second node using the second voltage adjustment circuit comprises using all three of the first input voltage, the second input voltage, and the third input voltage.

19. The method of claim 17, wherein the first voltage adjustment circuit comprises a plurality of resistive voltage dividers each comprising a first resistor having a first resistance and a second resistor having a second resistance.

20. The method of claim 19, wherein the second voltage adjustment circuit comprises a plurality of resistive voltage dividers each comprising a third resistor having a third resistance and a fourth resistor having a fourth resistance, wherein the third resistance is one of twice and three times the first resistance, and wherein the fourth resistance is one of twice and three times the second resistance.

* * * * *